United States Patent

[11] 3,587,608

| [72] | Inventor | Andre Fortier<br>12 Rue Leon Cambillard, 92 Clamart, France |
|---|---|---|
| [21] | Appl. No. | 799,208 |
| [22] | Filed | Feb. 14, 1969 |
| [45] | Patented | June 28, 1971 |
| [32] | Priority | Jan. 15, 1968 |
| [33] | | France |
| [31] | | 139,931 |

[54] DIFFERENTIAL FLUIDIC LOGIC CELL
10 Claims, 5 Drawing Figs.

| [52] | U.S. Cl. | 137/81.5 |
|---|---|---|
| [51] | Int. Cl. | F15c 1/20 |
| [50] | Field of Search | 137/815 |

[56] References Cited
UNITED STATES PATENTS

| 3,272,215 | 9/1966 | Bjornsen et al. | 137/81.5 |
|---|---|---|---|
| 3,378,022 | 4/1968 | Solenson | 137/81.5 |
| 3,426,780 | 2/1969 | Gray | 137/81.5 |
| 3,446,228 | 5/1969 | Stouffer et al. | 137/81.5 |

*Primary Examiner*—William R. Cline
*Attorney*—Irving M. Weiner

ABSTRACT: A differential fluid logic cell having an elongated enclosure, each end of which is provided with an identical axial nozzle and a lateral fluid exit. Fluid brought into the enclosure through the two nozzles under substantially equal pressures leaves the enclosure in such a way that the difference in fluid flow escaping through the fluid exits changes its sign in response to a change in sign of the difference in pressures prevailing in the ends of the enclosure.

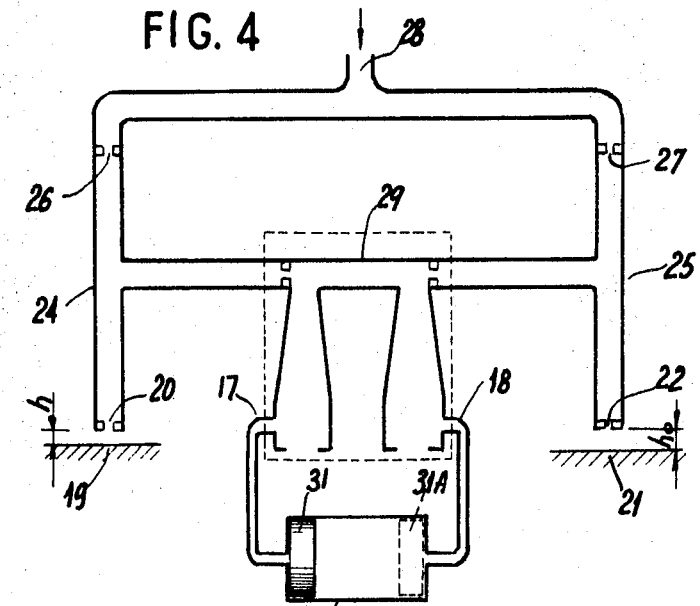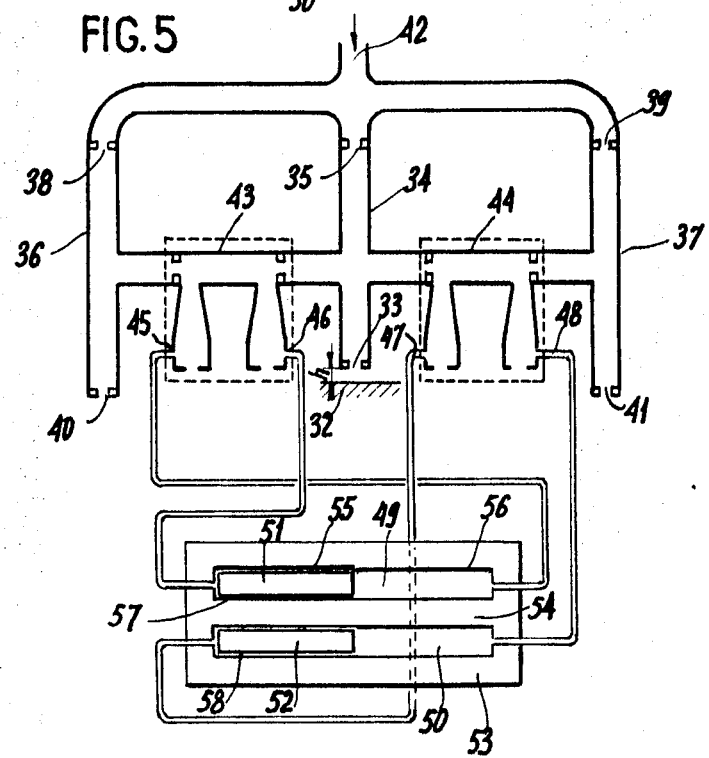

DIFFERENTIAL FLUIDIC LOGIC CELL

SUMMARY OF THE INVENTION

It is known that the use of fluid calculators, i.e. based on the flow of fluids, is particularly indicated in all applications for which a great speed of logic operations is not indispensable, but which require on the contrary a great viability, an operation completely independent of external conditions, and finally a great exit force.

In those calculators or regulators, the logic operations are performed with the aid of devices based mainly on the Coanda effect, or the transition from the laminar region to the turbulent region. A unit or a logic cell generally includes a main jet that can selectively occupy one or the other of two positions, or selectively present one or the other of two distinct configurations, the transition from one state to the other being caused by the action of a control jet of little power.

Such devices are not easily adapted to the control of a main jet by a difference in pressure. But there already exists, in many industrial applications, measuring or control apparatuses, whose information is to be expresses finally by a difference in pressure. It would therefore be very interesting to be able to achieve fluid logic cells which could be activated by a simple difference in pressure; and that is precisely the object of the invention.

The present invention provides a differential fluid logic cell including an elongated enclosure. Two identical nozzles are disposed along the longitudinal axis of the elongated enclosure. A first one of the nozzles is arranged at one end of the elongated enclosure, and a second one of the nozzles is arranged at the other end of the elongated enclosure. The nozzles are connected to one or more sources of fluid. The elongated enclosure is also provided with two lateral fluid exits. One of the exits is disposed near one end of the elongated enclosure, and the other one of said exits is disposed near the other end of said elongated enclosure, so that fluid brought into the enclosure simultaneously through the nozzles being fed under substantially equal pressures will leave the enclosure in such a way that the difference in fluid flow escaping through the exits changes its sign in response to a change in sign of the difference in pressure prevailing in the ends of the enclosure.

With a cell of such structure, when the feeding pressure of either one of the two nozzles is greater than the feeding pressure of the other nozzle, the fluid escapes practically entirely through the lateral exit zone remote from the nozzle fed under the higher pressure. The result is that, according to whether the feeding pressure of one of the nozzles is either less than or greater than the feeding pressure of the other, the fluid exits through one or the other of the two lateral exit areas.

In a variation, by feeding the two nozzles under the same pressure, for example from the same source, it is also possible to obtain, selectively, the departure of the fluid practically solely through one or the other of the two lateral exit areas, selectively, by selectively connecting one or the other of the two ends of the aforementioned enclosure to a source of pressure different from the pressure that prevails inside said enclosure.

In a general way, the sensitivity of the apparatus is a function of the dimensions and their different elements and, particularly, of the ratio of the diameters or cross-sectional flow capacities of the nozzles holes to the inside diameter or cross-sectional flow capacity of the enclosure. We can even achieve, in certain conditions, as we will see later, a hysteresis phenomenon in the changing of the lateral zone through which the fluid leaves.

In practice, the use of the differences of fluid flow escaping through the two lateral exit areas would be possible by the transformation in pressure variations using any of the appropriate classical means, i.e. by means of divergents.

The invention may be better understood by reading the following description and studying the annexed drawings which, as an example, show some methods of realizing a differential fluid logic cell according to the invention.

BRIEF DESCRIPTION OF THE DRAWINGS

FIG. 4 is a schematic of a device for controlling of a machine part as a function of a dimension under the control of a differential fluid logic cell similar to the cell of FIG. 3.

FIG. 5 is the schematic of a device for controlling pieces having a tolerance above and below a nominal FIG., utilizing two cells of the type shown in FIG. 3.

DETAILED DESCRIPTION

Figure 1:
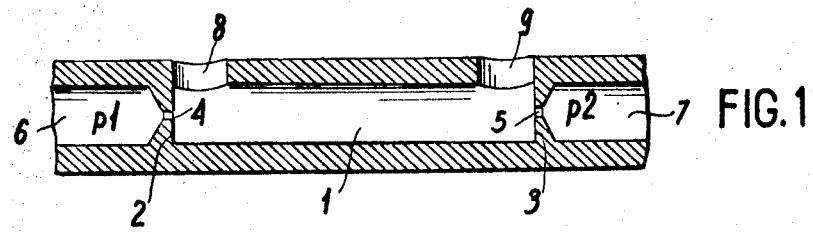
FIG. 1 represents diagrammatically, in a cross section, the fundamental element of the differential fluid logic cell, according to the invention.

The fundamental element of a differential fluid logic cell according to the invention, as shown in FIG. 1, includes an elongated enclosure 1 in the form of cylindrical duct in this example, limited on its two ends by two walls 2 and 3, constituting the two bottom ends of the enclosure and into which emerge two identical orifices 4 and 5 which will be referred to herein as nozzles.

The nozzles 4 and 5 are connected respectively through two channels 6 and 7 with two fluid sources (not shown) under substantially equal pressures $p1$ and $p2$. Furthermore, the two ends of the duct 1 respectively present on the bare parts of the bulkhead ends 4 and 5, two lateral zones 8 and 9 for departure of the fluid brought in the said duct by the two nozzles 4 and 5.

Although the two pressures $p1$ and $p2$ are substantially equal, in practice one of them is always smaller than the other, even if such difference is minute, and the cell frequently would be using these slight differences in the pressures $p1$ and $p2$ without us knowing ahead of time which pressure would be greater than the other at the considered moment.

This element functions as follows:

When pressure $p1$, for example, is greater than pressure $p2$, the fluid entering the duct 1 through the orifices 4 and 5 exits through orifice 9, and practically nothing exits through orifice 8. When one decreases pressure $p1$ or increases pressure $p2$, i.e., when one decreases the difference in pressure $(p1-p2)$, a value of $(p1-p2)$ very close to zero is attained at which the flow vacillates and the fluid then exits mainly through orifice 8.

Thus, when the pressure $p1$ is greater, the fluid exits through orifice 9; whereas when it is lower, the fluid exits through orifice 8.

The ratio of the absolute value of the difference of pressure $(p1-2)$ to the average pressure $(p1+p2)/2=pm$, which causes the transition of the flow from one of the orifices 8 or 9 into the other, could be rendered as small as desired if the ratio of the orifice cross sections of nozzles 4 and 5 to the cross section of duct 1 is suitably chosen.

If, for example, duct 1 is a duct of circular cross section of diameter D and of length 10D, the orifices 8 and 9 with circular cross sections of equal diameter D and tangent to the walls 2 and 3, the orifices 4 and 5 of the nozzles with circular cross sections coaxial with duct 1 and of diameter $d$, then the functioning of the logic cell depends on the ratio $d/D$.

For $d/D=0.33$, when $p1>p2$ and $(p1-p2)/pm=1/10$, all the flow passes through the orifice 9. If from this value of $(p1-p2)/pm$, one decreases $(p1-p2)$ while keeping $pm$ constant, the flow from orifice 9 decreases slowly and, correlatively, the flow from orifice 8 increases slowly until the ratio $(p1-p2)/pm$ is of the order 2.5/100. Below this ratio, the flow from orifice 9 decreases very rapidly, becomes equal to and then becomes less than the flow from orifice 8. Thus, for a variation in $(p1-p2)/pm$ of 5 percent, the greater part of the total flow that passed through orifice 9 when $p1>p2$, passes through orifice 8 for $p1<p2$.

In another embodiment, if one makes $d/D=0.40$, the phenomena are qualitatively the same, but the value of $(p1-p2)/pm$ for which there is an abrupt change in the variation rule of the flow of one of the orifices 8 or 9 in terms of $(p1-p2)$ is of the order of 2/1000.

Finally, in another example where $d/D=0.5$, when $p1>p2$ all of the flow passes through orifice 9. Then when $(p1-p2)$ decreases, becomes zero and changes its sign, almost all of the flow continues to pass through orifice 9 until $(p1-p2)/pm$ becomes 2/100, the value for which the flow changes suddenly from orifice 9 to orifice 8. If $(p2-p1)/pm$ is then decreased, all of the flow continues to pass through orifice 8 until, $(p-2-p1)$ having changed sign, the value of $(p1-p2)/pm=2/100$ is attained; a value for which the flow changes suddenly from orifice 8 to orifice 9. Thus for $d/D=0.5$ and when $p1=p2$, the flow retains the memory of the sign of the previous pressure difference $(p1-p2)$. To erase that memory it is necessary to apply a difference in pressure with opposite sign such as $(p1p2)/pm=$.

These numerical values are given in the form of examples to show that the logic element according to the invention may have a variable amplification depending on the ratio of the cross section of orifices 4 and 5 of the nozzles to the cross section of duct 1, and serve as memory elements preserving information in binary form.

In the preceding, it is assumed that the two pressures $p1$ and $p2$, although roughly equal, had however different values, and precisely this difference, of variable sign, is used to make the cell function. But one can proceed in a different manner and feed, for example, the two nozzles 4 and 5 from the same fluid source under a pressure $p$ and introduce a slight dissymmetry between the ends of duct 1 by injecting through one or several orifices of the ends of said duct a slight fluid flow which then instigates the passage of the total fluid flow from one of the exit orifices 8 or 9 into the other.

No matter what, the exit signal of the differential fluid logic element described above appears in the form of a fluid flow. In practice this signal will frequently be transformed into a pressure signal by any standard means known for this purpose.

Figure 2:
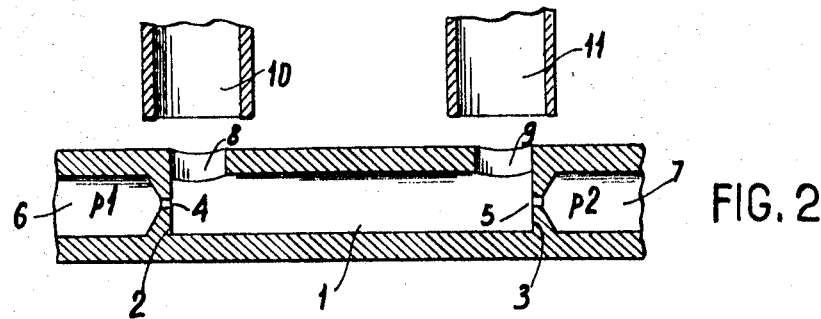
FIG. 2 shows a cell using the element of FIG. 1 in which the variations in exit flow are utilized in the form of pressure variations.

In FIG. 2, one of these means is represented in the form of two tubes 10 and 11 disposed in front of the orifices 8 and 9, within a short distance of them and in such a way that the pressure prevailing in those tubes is equal to the means dynamic pressure at the exit of the corresponding orifice 8 or 9. If, for example, the greater part of the total flow leaves through orifice 9, the corresponding tube 11 is overpressured relative to tube 10.

Figure 3:
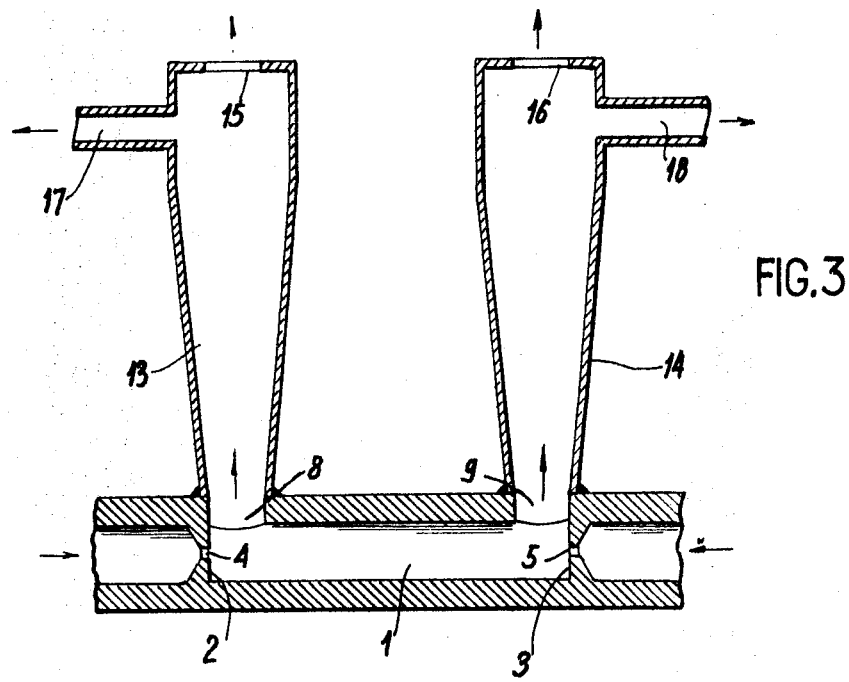
FIG. 3 shows a modification of the device of FIG. 2.

FIG. 3 shows another means which consists of placing, below the orifices 8 and 9, two divergents 13 and 14, respectively, which communicate with the exterior by equally calibrated orifices or, in a more general way, by two equal air flow resistances or restricting outlets 15 and 16 and includes two tubes 17 and 18 which allow the transmission of pressure signals in response to flow variations in the exit orifices 8 and 9. As shown, the air restricting outlets 15 and 16 are in the upper end walls of the tubes 13 and 14, respectively in overlying relation to the exits 8 and 9.

To give an example of industrial applications of the logic element according to the invention, in FIG. 4 is represented the diagram of a control device of a machine-tool part when a dimension of a machined piece or a length which is a function of the displacement of the part, attains a given reference value. The variations of the dimension or the length compared to the reference length bring about variations of distance $h$ from a solid surface 19 to an orifice 20. The reference length is introduced in the form of a fixed distance $h_o$ from a solid wall to an orifice 22. The orifices 20 and 22 are situated at the ends below two channels 24 and 25 including, respectively, the calibrated orifices 26 and 27 upstream fed by the same source of compressed air 28. Between the channels 24 and 25 there is a logic cell 29 according to the invention of the type shown in FIG. 3, the exits 17 and 18 of which communicate, respectively, with the two chambers defined in a cylinder 30 by a movable piston 31. If, for example, the orifices 26 and 27 are identical as well as the orifices 20 and 22, the pressure $p1$ in the channel 24 is greater than the pressure $p2$ in the channel 25 when $h<h_o$. Thus, when $h<h_o$ the piston 31 is in the position shown in full lines, whereas it is in the position 31A shown in dashed lines when $h>h_o$; the transition from one position to the other taking place when $h$ oversteps reference value $h_o$. If piston 31 is joined to a machine part, the movement of this part is brought about when the considered dimension attains and then passes over the reference value.

FIG. 5 shows the application of the logic element of the invention to the control of the dimension of a piece defined with a given tolerance. The dimension to be controlled is a function of the distance $h$ from a solid wall 32 to an orifice 33 and the extreme values of the dimension to be controlled, defining the tolerance, correspond to two values $h_o$ and $h1$ of $h$. The orifice 33 is located at the lower end of a channel 34 including a calibrated orifice 35 upstream. In parallel with the channel 34 there are two channels 36 and 37 including, respectively, the calibrated orifices 38 and 39 upstream and the calibrated orifices 40 and 41 downstream. The three channels 34, 36 and 37 are fed by the same source of compressed air 42. A logic cell 43 according to the invention is shunted between channels 34 and 36. A logic cell 44 according to the invention is shunted between channels 34 and 37. The exits 45 and 46 of the element 43 and the exits 47 and 48 of the element 44 communicate respectively with two compartments faced by a visual indicator. This visual indicator includes two parallelepiped cavities 49 and 50 containing respectively two parallelepiped slides 51 and 52 which can move freely in the cavities 49 and 50 with little play. The walls 53 and 54 of the cavities are transparent but the slides 51 and 52 are opaque. The portion of the wall 55 of the cavity 49 is red, for example; while the portion of wall 56 is green, for example; and the faces 57 and 58 of the slides are white. The two compartments of the cavities 49 and 50 defined in each cavity by the corresponding slide communicate for cavity 49 through exits 45 and 46 of the logic cell 43, and for the cavity 50 through exits 47 and 48 of the logic cell 44. Under these conditions, if the orifices 40 and 41 are chosen in such a manner that they correspond to the values $h_o$ and $h1$ of $h$ fixing the tolerance limits, one sees that if $h<h_o<h1$ the two slides conceal the portion of the wall 55, and seen through surface walls 53 and 54, the indicator is white and green. When $h_o<hh1$ the two slides conceal the walls 55 and 56 and the indicator is white. Finally, when $h_o<h1<h$ the two slides conceal wall 56 and the indicator is red and white.

By placing in parallel relative to the channel 34 (FIG. 5), not only two but $n$ channels each including at its its downstream end a calibrated orifice corresponding to a value of $h$, one can in a more general way classify the proportion of a piece relative to the prefixed $n$ values by utilizing a visual indicator, similar to the indicator shown on FIG. 5, but including $n$ cavities and digits instead of colors, one obtains a measuring apparatus with digital readings.

The use of visual indicators was given as an example, but it is clearly possible, with the help of slides or pistons, to connect or disconnect electric contacts or even directly control the movement of a part of sorting machine for example.

Of course, the invention is by no means limited to the embodiments described and illustrated. It is subject to numerous modifications accessible to a person skilled in the art according to the envisaged applications without departing from the spirit of the invention.

I claim:

1. A differential logic cell comprising, in combination:
  an elongated enclosure;
  two nozzles disposed substantially along the longitudinal axis of and in communication with said elongated enclosure;
  a first one of said nozzles being arranged at one end of said elongated enclosure;
  a second one of said nozzles being arranged at the other end of said elongated enclosure;

said nozzles being connected to one or more sources of pressurized fluid;

said elongated enclosure having two lateral fluid exits, one of said exits being disposed near said one end of said elongated enclosure, and the other of said exits being disposed near said other end of said elongated enclosure so that fluid brought into said enclosure simultaneously through said nozzles under substantially equal pressures will leave said enclosure in such a way that the difference in fluid flow escaping through said exits changes its sign in response to a change in sign of the difference in pressure prevailing in said ends of said enclosure; and a pair of tubes respectively communicating with said two lateral exits and extending laterally of said elongated enclosure, a fluid flow restricting outlet in each of said tubes and respectively opposite and overlying said two lateral exits, and a fluid pressure outlet in each of said tubes between said lateral exits and said fluid flow restricting outlets.

2. A differential fluid logic cell according to claim 1, characterized in that the ratio of the cross-sectional flow capacity of the orifice of said nozzles to the cross-sectional flow capacity of said elongated enclosure is in the order of 0.33 which provides the cell with a relative sensitivity of approximately 5 percent.

3. A differential fluid logic cell according to claim 1, characterized in that the ratio of the cross-sectional flow capacity of the orifice of said nozzles to the cross-sectional flow capacity of said elongated enclosure is in the order of 0.40 which provides the cell with a relative sensitivity of approximately 2 percent.

4. A differential fluid logic cell according to claim 1, characterized in that the ratio of the cross-sectional flow capacity of the orifice of said nozzles to that of the cross-sectional flow capacity of said elongated enclosure is in the order of 0.5 which provides the cell with a hysteresis effect in the change of the course of the departure of the fluid from said elongated enclosure.

5. A differential fluid logic cell according to claim 1, characterized in that said two nozzles are identical in shape and dimensions, and in that each of said two lateral fluid exits is tangent to a plane transverse to and coincident with the outlet of said nozzles.

6. A differential fluid logic cell according to claim 1, characterized in that the ratio of the cross-sectional flow capacity of the orifice of said nozzles to that of the cross-sectional flow capacity of said elongated enclosure is in the range of 0.30 to 0.60.

7. A differential fluid logic cell comprising, in combination:

an elongated enclosure;

two nozzles disposed substantially along the longitudinal axis of and in communication with said elongated enclosure;

a first one of said nozzles being arranged at one end of said elongated enclosure;

a second one of said nozzles being arranged at the other end of said elongated enclosure;

said nozzles being connected to one or more sources of pressurized fluid; and said elongated enclosure having two laterally directed fluid exits respectively disposed adjacent said first and second nozzles so that fluid brought into said enclosure simultaneously through said nozzles under substantially equal pressures will exit from said enclosure in such a way that the difference in fluid flow escaping through said exits changes its sign in response to a change in sign of the difference in pressures prevailing in said end of said enclosure; two tubes in communication respectively with said two lateral fluid exits and diverging therefrom; a fluid flow restricting outlet in each of said tubes, and a lateral pressure outlet in each of said tubes downstream of the largest diameter of respective ones of said tubes.

8. A differential fluid logic cell according to claim 7 characterized in that said tubes have outer end portions of uniform diameter and that said fluid restricting outlets and said lateral pressure outlets are located in said end portions.

9. A differential fluid logic cell according to claim 8 characterized in that said fluid restricting outlets are located in the outer end of said tubes in overlying relation respectively to said lateral fluid exits.

10. A differential fluid logic cell according to claim 7, characterized in that the ratio of the cross-sectional flow capacity of the orifice of said nozzles to that of the cross-sectional flow capacity of said elongated enclosure is in the range of 0.30 to 0.60.